United States Patent
Zhong et al.

(10) Patent No.: US 6,909,750 B2
(45) Date of Patent: Jun. 21, 2005

(54) DETECTION AND PROPER INTERPOLATION OF INTERLACED MOVING AREAS FOR MPEG DECODING WITH EMBEDDED RESIZING

(75) Inventors: Zhun Zhong, Croton-on-Hudson, NY (US); Yingwei Chen, Ossining, NY (US); Tse-Hua Lan, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 682 days.

(21) Appl. No.: 09/846,528

(22) Filed: May 1, 2001

(65) Prior Publication Data

US 2002/0163969 A1 Nov. 7, 2002

(51) Int. Cl.[7] .................... H04N 7/12; H04N 11/02
(52) U.S. Cl. ................ 375/240.17; 375/240.25; 375/240.16
(58) Field of Search ............... 375/240.16, 240.17, 375/240.21, 240.25; 348/556, 441, 458

(56) References Cited

U.S. PATENT DOCUMENTS

| | | | | |
|---|---|---|---|---|
| 5,635,985 A | * | 6/1997 | Boyce et al. | 375/240.15 |
| 6,148,033 A | * | 11/2000 | Pearlstein et al. | 375/240.16 |
| 6,184,935 B1 | * | 2/2001 | Iaquinto et al. | 348/441 |
| 6,252,906 B1 | * | 6/2001 | Canfield | 375/240.21 |
| 6,310,919 B1 | * | 10/2001 | Florencio | 375/240.16 |
| 6,584,154 B1 | * | 6/2003 | Wu | 375/240.16 |
| 6,690,836 B2 | * | 2/2004 | Natarajan et al. | 382/250 |
| 2002/0150159 A1 | * | 10/2002 | Zhong | 375/240.16 |

FOREIGN PATENT DOCUMENTS

| | | | |
|---|---|---|---|
| EP | 0687112 A2 | 6/1995 | H04N/7/50 |
| EP | 0955607 A2 | 4/1999 | G06T/9/00 |
| EP | 0955609 A1 | 5/1999 | G06T/9/00 |
| WO | WO0030359 | 11/1999 | H04N/7/26 |

OTHER PUBLICATIONS

Adaptive motion vector resampling for compressed video down–scaling□□Shen, D.; Sethi, I.E.; Bhaskaran, V.; Image Processing, 1997. Proceedings., International Conference on , vol.: 1 , Oct. 26–29, 1997; pp.: 771–774 vol. 1□□.*

* cited by examiner

*Primary Examiner*—Chris Kelley
*Assistant Examiner*—Erick Rekstad

(57) ABSTRACT

The present invention is directed to MPEG decoding with embedded resizing that includes detecting and interpolating moving areas in interlaced video in order to eliminate irregularities in the output video. According to the present invention, the decoding includes down scaling a motion vector. Also, detecting a moving area in an interlaced video reference frame and modifying the reduced resolution motion vector. Further, retrieving pixel values from the interlaced video reference frame according to the modified motion vector.

11 Claims, 8 Drawing Sheets

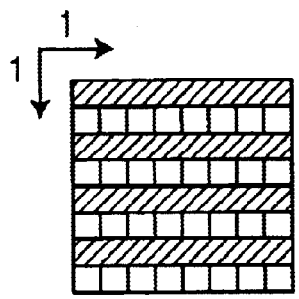
FIG. 9
```
diff = 0;                                    // difference
for (selected i) {                           // for each selected column i
    for (j=0; j<h; j+=2){                    // for each adjacent pair of pixels
        diff += src[j][i] - src[j+1][i];     // calculate the difference and accumulate
    }
}
diff /= (# of selected i) * h/2;             // average
if (abs(diff) > threshold) {
        moving area;
} else {
        no moving area;
}
```
FIG. 10
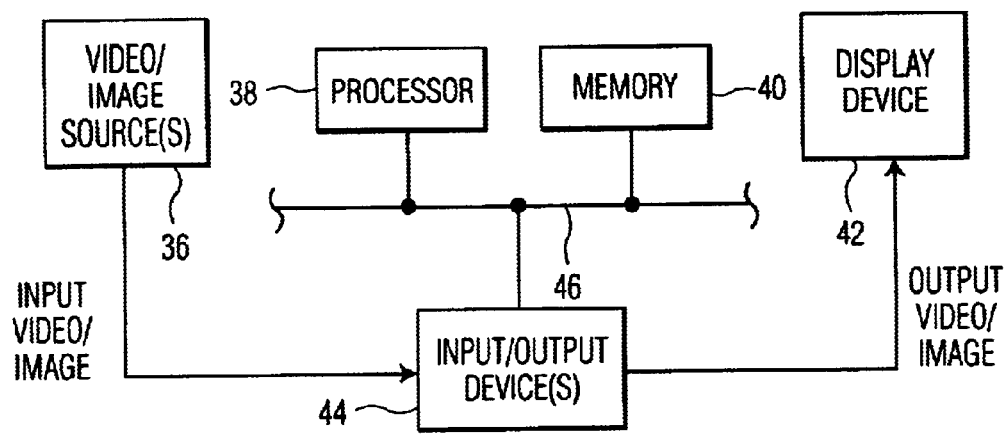
FIG. 11

DETECTION AND PROPER INTERPOLATION OF INTERLACED MOVING AREAS FOR MPEG DECODING WITH EMBEDDED RESIZING

BACKGROUND OF THE INVENTION

The present invention relates generally to video compression, and more particularly, to MPEG decoding with embedded resizing that includes detecting and interpolating moving areas in interlaced video in order to eliminate irregularities in the output video.

Video compression incorporating a discrete cosine transform (DCT) and motion prediction is a technology that has been adopted in multiple international standards such as MPEG-1, MPEG-2, MPEG-4, and H.262. Among the various DCT/motion prediction video coding schemes, MPEG-2 is the most widely used, in DVD, satellite DTV broadcast, and the U.S. ATSC standard for digital television.

In some applications, it is desirable to display the decoded video at a smaller resolution than received. For example, in high definition television (HDTV) applications, there is increased interest in low cost MPEG decoders with high definition (HD) capacity and standard definition (SD) format output.

In the above applications, MPEG-2 decoders have been configured to include down scalers in order to reduce the resolution of the HD to the SD format. This down scaling has been performed externally or internally of the decoding loop. However, internally embedding the down scaling in the decoding loop is desirable to reduce the memory and computational power required to perform the decoding.

One example of a MPEG-2 decoder with embedded resizing is shown in FIG. 1. As can be seen, the decoder includes a first path made up of the variable-length decoder (VLD) 2, an inverse-scan and inverse-quantization (ISIQ) unit 4 and a 4×4 inverse discrete cosine transform (IDCT) unit 6. A second path is included made up of the VLD 2, down scaler 10 and ¼ pixel motion compensation unit 12. An adder 8 is also included that combines the outputs of the first and second paths to produce the output video.

During operation, the first path 2,4,6 produces intra coded frames and residual error frames, and the second path 2,10,12 produces motion compensated residual frames by performing motion compensation on reference frames stored in a frame store 14. In particular, the down scaler 10 scales down the motion vectors to the reduced resolution of the first path. Due to this down scaling, the motion vectors now have a ¼ pixel resolution. This means that non-integer pixel positions such as a "¼", "½" or "¾" pixel position is capable of being retrieved from the reference frames when performing motion compensation.

Further, the ¼ pixel MC unit 12 than retrieves data from the reference frames stored in the frame store 14 according to the decoded motion vectors. If the motion vector (MV) is an integer value, the MC unit 12 will just retrieve the pixel values starting at the pixel position indicated by that MV. If the MV is not an integer, the MC unit 12 will retrieve pixel values at integer pixel positions neighboring the pixel position indicated by the MV and perform an interpolation to calculate the pixel values at the non-integer pixel positions. The pixel values resulting from this interpolation is the actual data that corresponds to the non-integer MV.

It should also be noted that MPEG-2 supports interlaced video. Thus, on the decoder side, either field MC or frame MC is performed depending on what was done on the encoder side. As can be seen from FIG. 2, in field MC, data from each field is fetched separately and then interlaced into data blocks. In frame MC, interlaced data from both fields is fetched at the same time.

SUMMARY OF THE INVENTION

The present invention is directed to method for decoding interlaced video frames. The method includes down scaling a motion vector to produce a reduced resolution motion vector. Also, detecting a moving area in an interlaced video reference frame and modifying the reduced resolution motion vector to produce a modified motion vector. Further, retrieving pixel values from the interlaced video reference frame according to the modified motion vector.

The present invention is also directed to a decoder. The decoder includes a first path for producing residual error frames and a second path for producing motion compensated residual frames. An adder is also included for combining the residual error frames and the motion compensated residual frames.

The second path includes a down scaler for producing a reduced resolution motion vector. The second path also includes a motion compensation unit for detecting a moving area in an interlaced video reference frame, producing a modified motion vector and retrieving pixel values from the interlaced video reference frame according to the modified motion vector.

BRIEF DESCRIPTION OF THE DRAWINGS

Referring now to the drawings were like reference numbers represent corresponding parts throughout:

FIG. 9 is one example of a data block that represents a moving area in interlaced video;

FIG. 10 is one example of pseudo-code for detecting moving areas in interlaced video according to the present invention; and FIG. 11 is a block diagram of one example of a system according to the present invention.

DETAILED DESCRIPTION

As previously described, MPEG-2 decoding with embedded resizing is a desirable configuration for applications where the output resolution of the decoded video is required to be reduced. In particular, this configuration is desirable since it reduces the memory and computational power required for decoding as compared to external scaling. However, embedded resizing requires that the motion compensation be performed in the reduced resolution.

Figure 3:
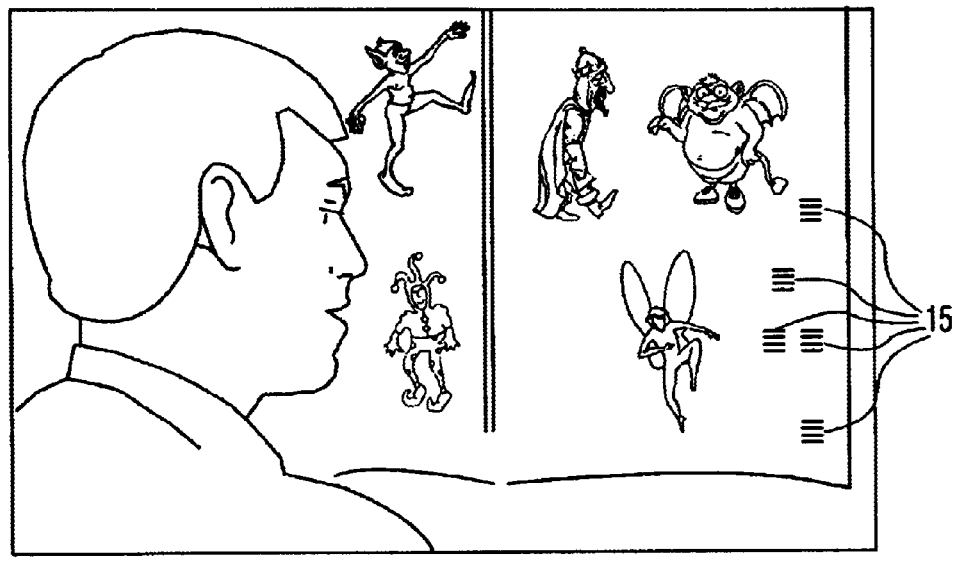
FIG. 3 is an example of irregularities that may occur in MPEG decoding with embedded resizing.

In some situations, performing the motion compensation in the reduced resolution does not present any problems. However, if frame MC is performed, irregularities in the output video may occur. One example of such an irregularity is shown in FIG. 3. As can be seen in this example, the output video includes a number of irregularities called interlaced block artifacts 15. These irregularities 15 are related to movement in the interlaced video frames used as reference frames for performing motion compensation.

In particular, in the areas of the interlaced video frame that includes movement, abrupt color differences occur between the two fields. This translates into a large difference between the pixel values of the two fields in these moving areas. In frame MC, interpolation between pixels of the two fields is required if the motion vectors being decoded are not integers. Since the motion vectors in MPEG-2 decoding with embedded resizing is scaled down, this causes one of the pixels to be over weighted when performing the interpolation. Thus, this over weighting is one cause of the interlaced block artifacts 15 shown in FIG. 3. In areas where there is no motion, such irregularities do not occur since there is only a small difference between the pixel values of corresponding areas.

In order to avoid this over weighting problem, decoders have been configured to round up all non-integer motion vectors to the nearest ½ pixel. However this was found not to be a good solution since it causes problems in the areas where there is no motion. In order to avoid these problems, the present invention is directed to MPEG decoding with embedded resizing that includes detecting and interpolating moving areas in interlaced video.

Figure 1:
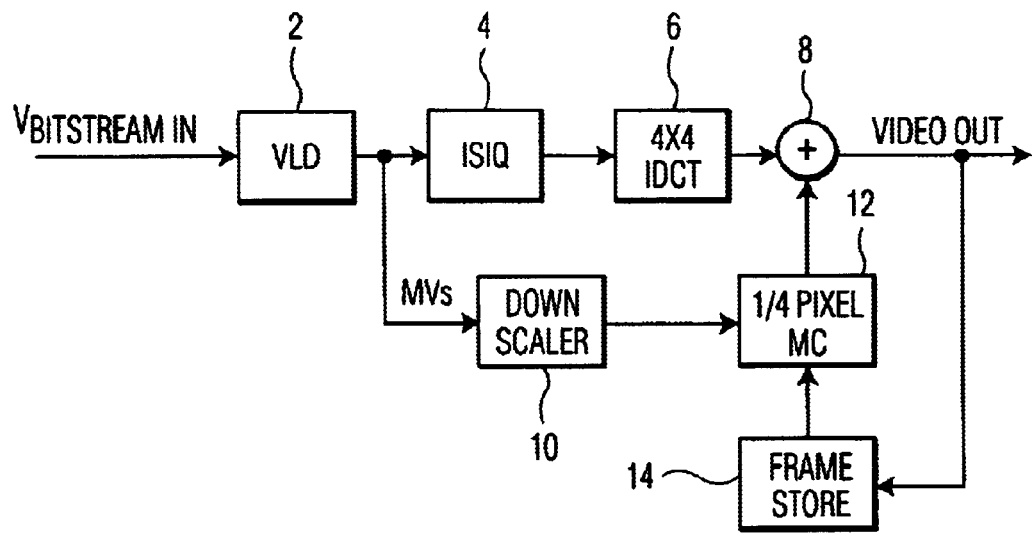
FIG. 1 is a block diagram of an MPEG-2 decoder with embedded resizing.
Figure 2:
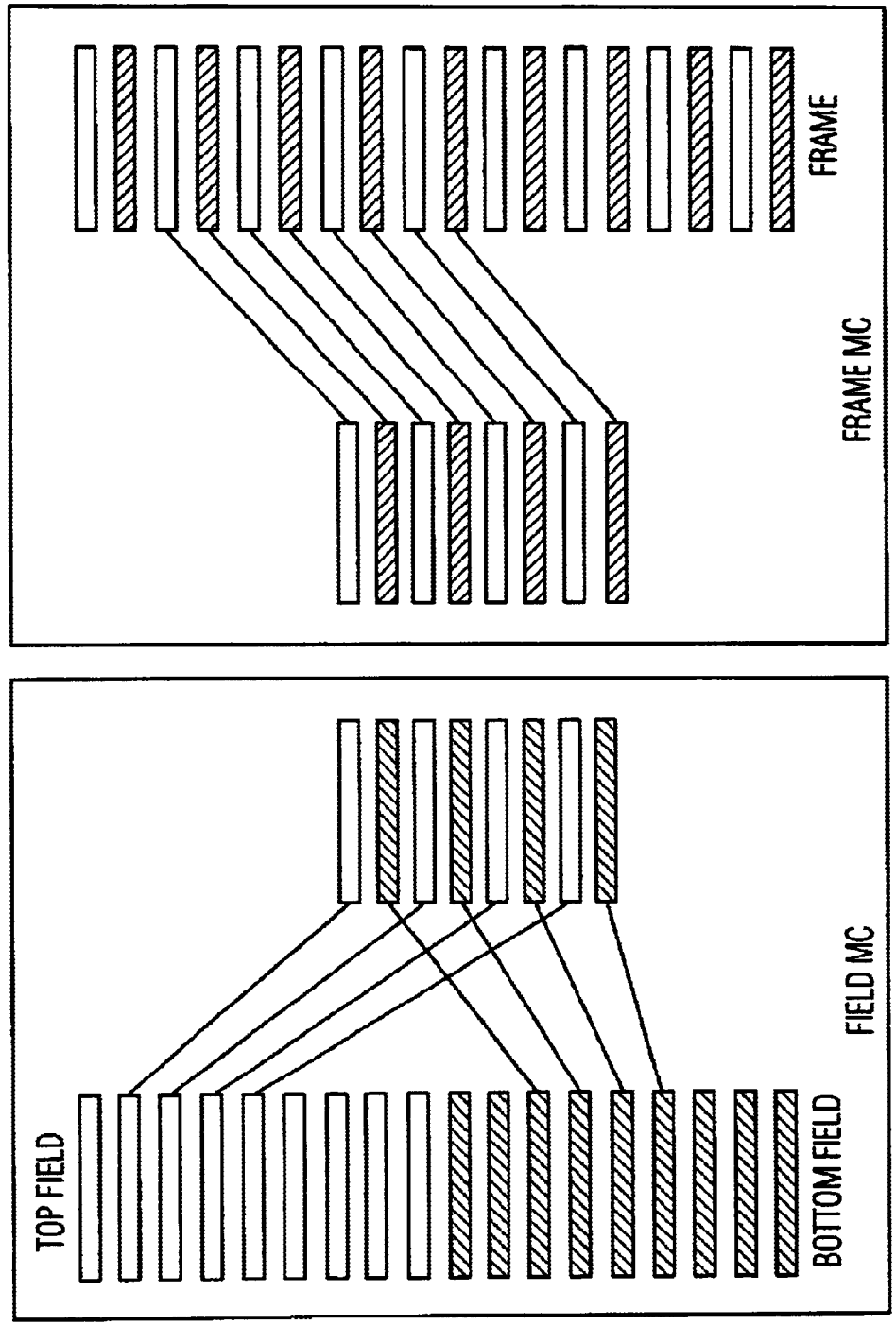
FIG. 2 is a diagram illustrating the difference between field motion compensation and frame motion compensation.
Figure 4:
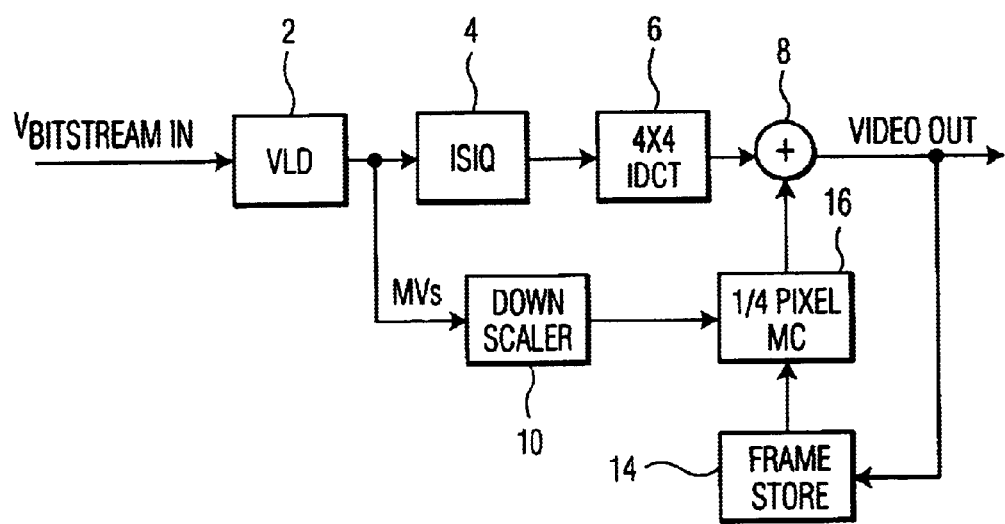
FIG. 4 one example of an MPEG-2 decoder with embedded resizing according to the present invention.

One example of an MPEG-2 decoder with embedded resizing according to the present invention is shown in FIG. 4. As can be seen, the decoder according to the present invention is the same as FIG. 1 except for the ¼ pixel MC unit 16. As in FIG. 1, the decoder includes a first path 2,4,6 for producing intra coded frames and residual error frames, and a second path 2,10,16 for producing motion compensated residual frames. An adder 8 is also included to combine the outputs of the first and second paths to produce the output video.

Also, during operation, the down scaler 10 scales the motion vectors to the reduced resolution of the first path. However, the present invention differs in that the ¼ pixel MC unit 16 operates to detect and interpolate moving areas when performing motion compensation.

Figure 5:
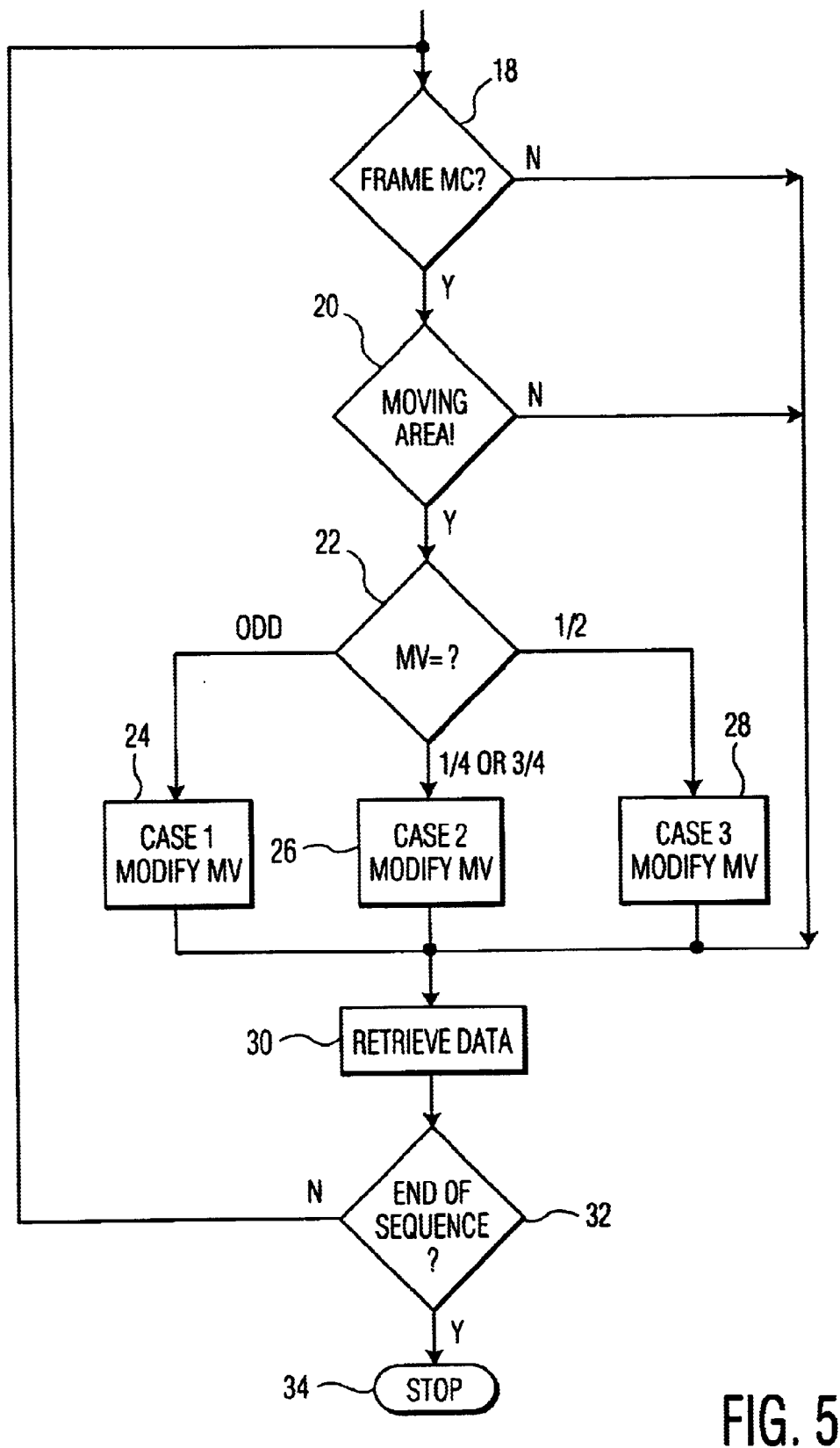
FIG. 5 is a flow diagram of one example of detecting and interpolating moving areas in interlaced video according to the present invention.

One example of how the ¼ pixel MC unit 16 operates is shown in FIG. 5. In this example, the ¼ pixel MC unit 16 processes the video sequence at the macro block level. Thus, steps 18–32 will be performed for each macro block until there are none left in the video sequence being processed. As can be seen, in step 18, it is determined whether frame MC has been performed on each of the macro blocks. This is performed by checking the header of each macro block. In MPEG-2, the macro block header includes a field that indicates if either field or frame MC was performed on the encoder side.

In step 18, if it is determined that frame MC was not performed on a particular macro block, than the method will skip to step 30 and retrieve data from the reference frame in the usual fashion. As previously described, the interlaced block artifacts only occur as a result of frame MC. Alternatively, in step 18, if frame MC has been performed, the method will advance to step 20.

In step 20, it is detected whether the MV of each macro block points to a moving area in the interlaced video reference frame. As previously described, it is the interpolation of these moving areas that cause the interlaced block artifacts. In order to detect a moving area, the difference between the two fields is calculated at the area in a reference frame pointed to by each motion vector. If the difference is small, then the area is not a moving area and the method will skip to step 30 and retrieve data in the usual fashion. If the difference is large, then the area is a moving area and the method will advance to step 22.

In step 22, the value of the vertical component of each motion vector (MV) that corresponds to a moving area in the reference frame is checked. At this time, it should be noted that the resolution of the MV has been scaled down to that of the first path of the decoder. Depending on its value, the vertical component of the motion vector (MV) will be modified in one of three cases in order to eliminate the interlaced block artifacts.

Figure 6A:
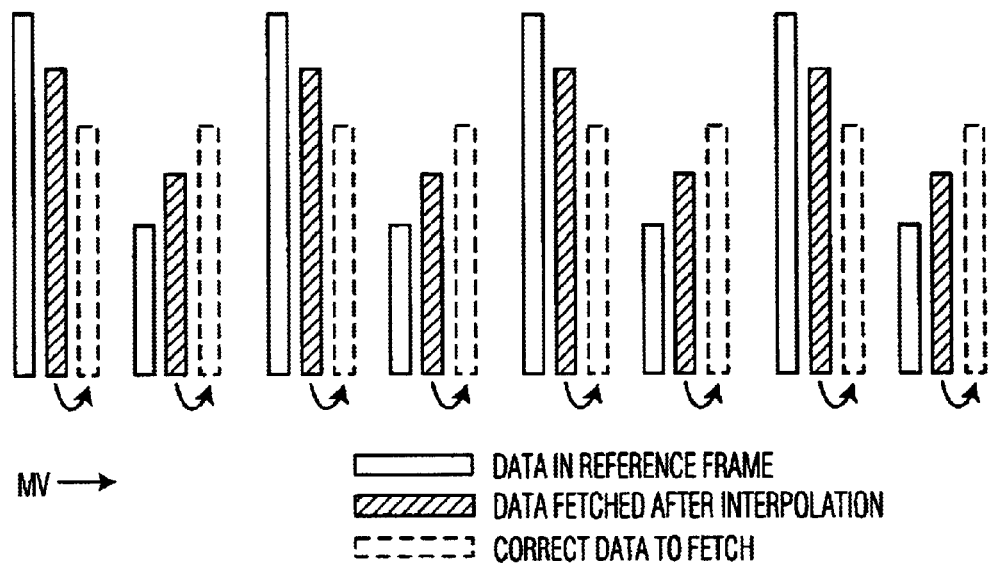
FIG. 6 is a diagram illustrating one case for modifying a MV according to the present invention.
Figure 6B:
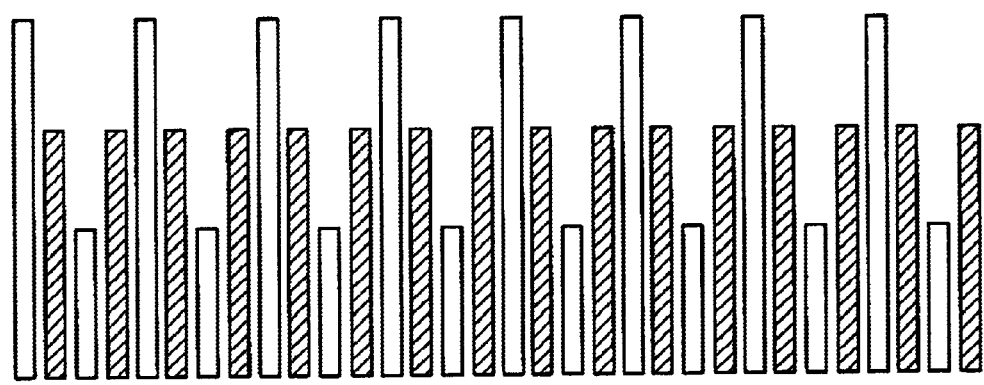

If the MV is includes either a "¼" or "¾" pixel position, the method advances to step 26 (Case 2). In step 26, the MV of a "¼" or "¾" position will be changed to a "½" position. For example, a MV=1.25 is changed to "1.5" value or a MV=3.75 is changed to a "3.5" value. In order to illustrate this case, FIG. 6 shows a column of pixels in the reduced resolution (a) and full resolution (b). Each bar represents either a whole or sub-pixel position. The height of the bars represents the magnitude of the pixels.

In the full resolution 6(b), the MV points to the "½" pixel position and thus the two interlaced fields are averaged resulting in "flat" pixel values being fetched after interpolating between the two fields. In the reduced resolution 6(a), due to the down scaling, the ½ pixel MV has been reduced to a "¼" pixel MV. Thus, after interpolating between the two fields, the pixel values retrieved is not "flat" in the reduced resolution. This is because in performing the interpolation more weight is given to the pixel closer to the pixel position indicated by the MV. In order to get the same "flat" pixel values, equal weight must be given to each field as in the full resolution. In this example, this is accomplished by changing the MV of a "¼" or "¾" to a "½" value.

Figure 7A:
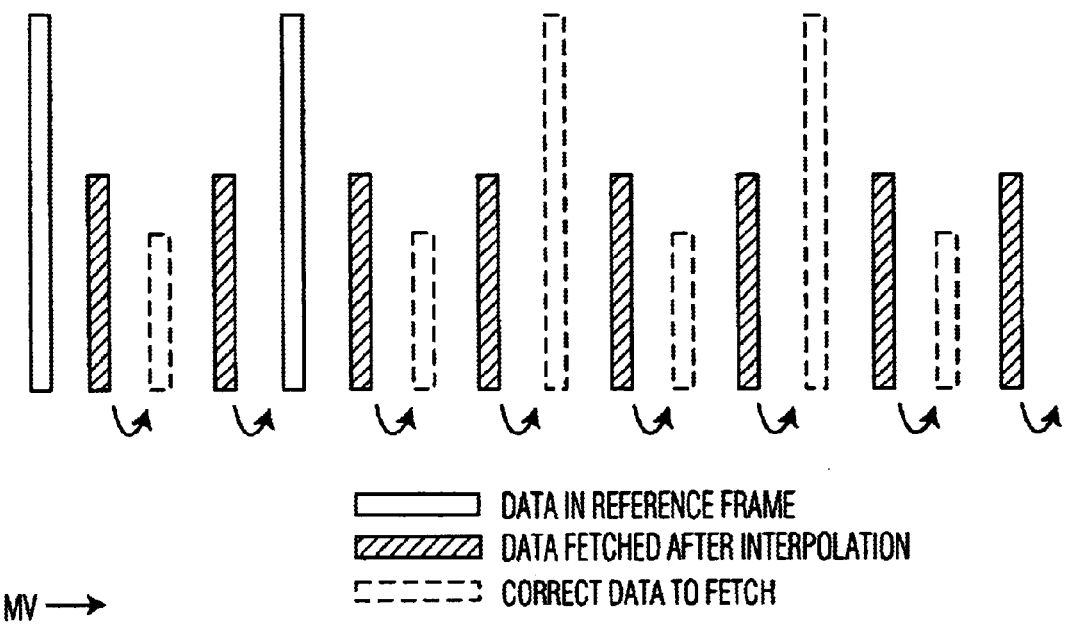
FIG. 7 is a diagram illustrating another case for modifying a MV according to the present invention.
Figure 7B:
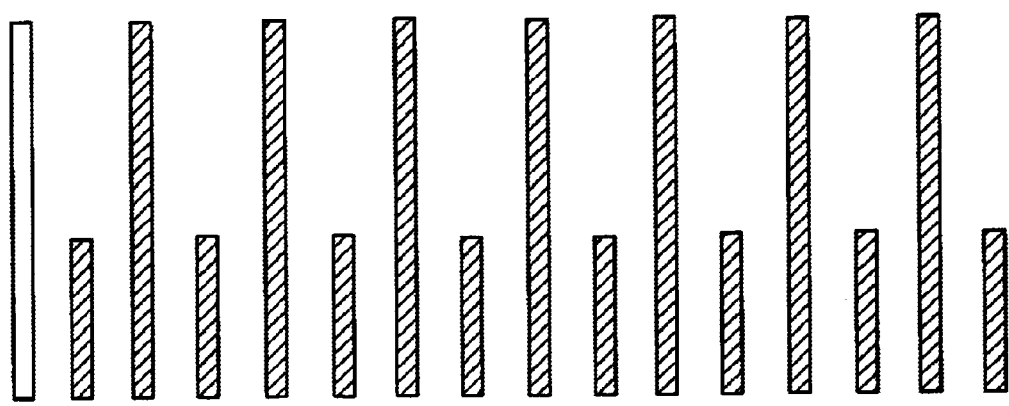

Referring back to FIG. 5, if the MV points to a ½ pixel position, the method advance to step 28 (Case 3). In step 28, the MV of "½" position is changed to the nearest odd integer position. For example, a MV=1.5 is changed to a "1" or a MV=3.5 is changed to a "3". In to illustrate this case, FIG. 7 shows a column of pixels in the reduced resolution (a) and full resolution (b).

In the full resolution 7(b), the MV points to a pixel in the bottom field and the pixel values are retrieved in a reverse field order. In the reduced resolution 7(a), due to the down scaling, the MV now points to a "½" pixel position. Thus, an interpolation between the two fields is performed, which results in the pixel values retrieved being the average of the two fields. However, the pixel values should be retrieved in the reverse field order, as in the full resolution. In this example, this is accomplished by changing the MV of "½" to a value of "1".

Figure 8A:
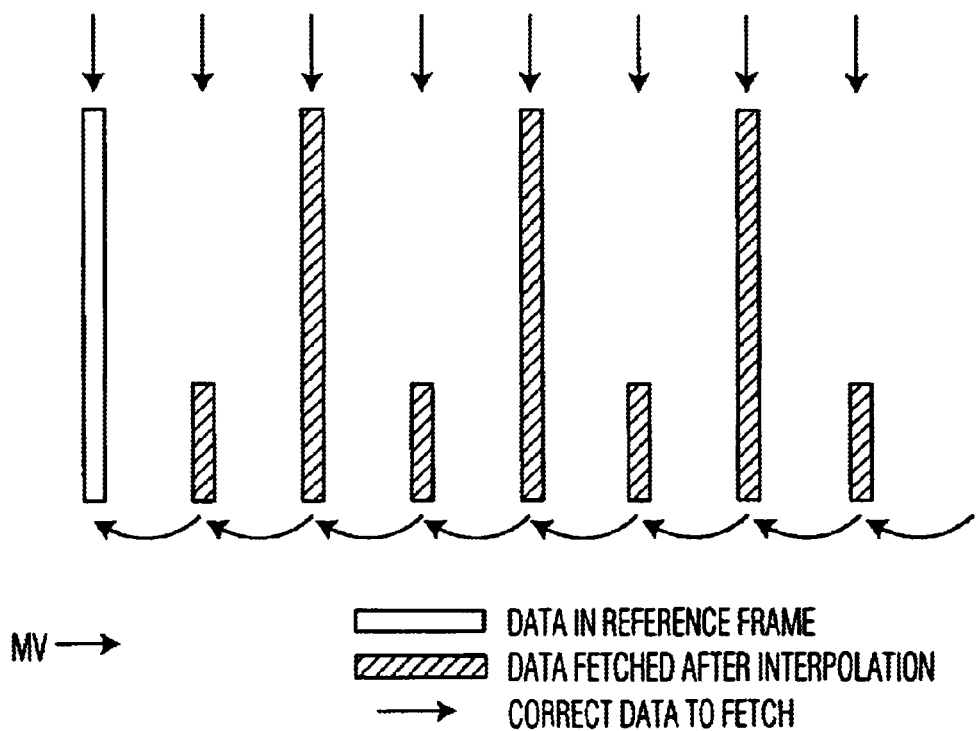
FIG. 8 is a diagram illustrating still another case for modifying a MV according to the present invention.
Figure 8B:
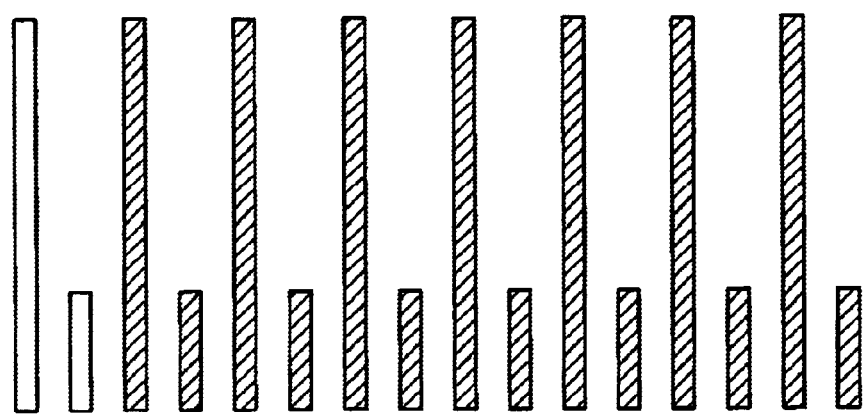

If the MV is an odd integer, the method will go to step 24 (case 1). In step 24, the odd integer MV will be changed to the nearest even integer position. For example, if the MV=3, it is changed to either a "2" or "4". In order to illustrate this case, FIG. 8 shows a column of pixels in the reduced resolution (a) and full resolution (b).

In the full resolution 8(b), the MV=2 and points to a pixel in the top field. Thus, in the full resolution, pixel values are retrieved in a forward order. In the reduced resolution 8(a), due to the down scaling, the MV=1 and points to a pixel in the bottom field. However, this is incorrect since the pixel values should be retrieved starting with the top field, as in the full resolution. In this example, this is accomplished by changing the MV of "1" to a value of either "0" or "2".

Referring back to FIG. 5, after modifying the MV in one of the three cases 24,26,28, the method will advance to step 30. In step 30, data from referenced frames will be retrieved according to the MV modified in one of the three cases, as described above. Since the MV has been modified so that data will be retrieved similar to the full resolution, the output video that results should not include any interlaced block artifacts.

After performing step 30, the method will advance to step 32 and see if it is the end of the sequence. If there are more macro blocks to be processed, the method will loop back to step 18 and repeat the above-described steps. If there are no more macro blocks left, the method will advance to step 34 and stop.

In step 20 of FIG. 5, it is detected whether the MV of each macro block points to a moving area in the interlaced video reference frame. As previously described, this is accomplished by calculating the difference between the two fields at the area pointed to by each MV. An example of a data block that represents a moving area is shown in FIG. 8. In this block, the dark rows represent the top field while the lighter one represents the bottom field. As can be seen, there is an abrupt color change between the two fields. Therefore, by taking the difference between the two fields, a large value will be produced indicating that this particular area is a moving area.

One example of a pseudo-code for performing step 20 is shown in FIG. 10. In the first line, a variable "diff" is initially set to zero. In the fourth line, the difference between the two fields of a data block is calculated. As can be seen, the difference between adjacent pixels (j,j+1) of the two fields is calculated and accumulated for each column (i) of the data block selected in line 2. It should be noted that the difference taken is not the absolute difference. It should also be noted that the more columns (i) selected in line 2, a more accurate detection will be obtained. However, in order reduce computations, a limited number of columns (i) may be selected in line 2. For example, only the first, last column, middle or every third column (i) may be selected to perform this detection.

In the fifth line, the difference (diff) is then averaged. This is necessary in order to scale the difference (diff) to the threshold in the sixth line. In this example, the average is calculated by dividing the difference (diff) by the number of columns (i) selected and the number of pairs of pixels (h/2) in each column.

In the sixth line, the absolute value of the difference abs(diff) is then compared to a threshold. In this example, the threshold would be for the difference between one pair of pixels such as twenty (20). If the abs(diff) exceeds the threshold, this indicates that a moving area has been detected. If the abs(diff) does not exceed the threshold, this indicates that a moving are was not detected.

One example of a system in which the MPEG decoding that includes detecting and interpolating moving areas in interlaced video according to the present invention may be implemented is shown in FIG. 11. By way of example, the system may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system includes one or more video sources 36, one or more input/output devices 44, a processor 38 and a memory 40.

The video/image source(s) 36 may represent, e.g., a television receiver, a VCR or other video/image storage device. The source(s) 36 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 44, processor 38 and memory 40 communicate over a communication medium 46. The communication medium 46 may represent, e.g., a bus, a communication network, one or more internal connections of a circuit, circuit card or other device, as well as portions and combinations of these and other communication media. Input video data from the source(s) 36 is processed in accordance with one or more software programs stored in memory 40 and executed by processor 38 in order to generate output video/images supplied to a display device 42.

In one embodiment, the decoding of FIG. 4 is implemented by computer readable code executed by the system. The code may be stored in the memory 40 or read/downloaded from a memory medium such as a CD-ROM or floppy disk. In other embodiments, hardware circuitry may be used in place of, or in combination with, software instructions to implement the invention.

While the present invention has been described above in terms of specific examples, it is to be understood that the invention is not intended to be confined or limited to the examples disclosed herein. For example, the present invention has been described using the MPEG framework. However, it should be noted that the concepts and methodology described herein is also applicable to any DCT/notion prediction schemes, and in a more general sense, any frame-based video compression schemes where picture types of different inter-dependencies are allowed. Therefore, the present invention is intended to cover various structures and modifications thereof included within the spirit and scope of the appended claims.

What is claimed is:

1. A method for decoding interlaced video frames, the method comprising the steps of:
   down scaling a motion vector to produce a reduced resolution motion vector;
   detecting a moving area in an interlaced video reference frame;
   modifying the reduced resolution motion vector to produce a modified motion vector; and
   retrieving pixel values from the interlaced video reference frame according to the modified motion vector;
   wherein the detecting the moving area in the interlaced video reference frame includes:
   calculating a difference between two fields at an area of the interlaced video reference frame corresponding to the motion vector; and
   comparing the difference between the two fields to a predetermined threshold.

2. The method of claim 1, wherein the reduced resolution motion vector is modified so that pixels from each field are given an equal weight while performing an interpolation.

3. The method of claim 1, wherein the reduced resolution motion vector is modified so that the pixel values are retrieved in a correct field order.

4. The method of claim 1, wherein a vertical component of the reduced resolution motion vector is modified by changing an odd integer to a nearest even integer.

5. The method of claim 1, wherein a vertical component of the reduced resolution motion vector is modified by changing a "¼" pixel position to a "½" pixel position.

6. The method of claim 1, wherein a vertical component of the reduced resolution motion vector is modified by changing a "¾" pixel position to a "½" pixel position.

7. The method of claim 1, which further includes determining if frame motion compensation was performed on each macro block of a video sequence.

8. The method of claim 1, wherein the difference between the two fields is calculated by accumulating the difference between adjacent pixels of the two fields in at least one column of the area of the interlaced video reference frame.

9. A method for decoding interlaced video frames, the method comprising the steps of:
    down scaling a motion vector to produce a reduced resolution motion vector;
    detecting a moving area in an interlaced video reference frame;
    modifying the reduced resolution motion vector to produce a modified motion vector; and
    retrieving pixel values from the interlaced video reference frame according to the modified motion vector;
    wherein a vertical component of the reduced resolution motion vector is modified by changing a "½" pixel position to the nearest odd integer position.

10. A memory medium including code for decoding interlaced video frames, the code comprising;
    a code for down scaling a motion vector to produce a reduced resolution motion vector;
    a code for detecting a moving area in an interlaced video reference frame;
    a code for modifying the reduced resolution motion vector to produce a modified motion vector; and
    a code for retrieving pixel values from the interlaced video reference frame according to the modified motion vector;
    wherein the code for detecting the moving area in the interlaced video reference frame includes:
    a code for calculating a difference between two fields at an area of the interlaced video reference frame corresponding to the motion vector; and
    a code for comparing the difference between the two fields to a predetermined threshold.

11. A decoder, comprising:
    a first path for producing residual error frames;
    a second path for producing motion compensated residual frames; and
    an adder for combining the residual error frames and the motion compensated residual frames;
    wherein the second path includes:
    a down scaler for producing a reduced resolution motion vector;
    a motion compensation unit for detecting a moving area in an interlaced video reference frame, producing a modified motion vector and retrieving pixel values from the interlaced video reference frame according to the modified motion vector;
    wherein the detecting the moving area in the interlaced video reference frame includes:
    calculating a difference between two fields at an area of the interlaced video reference frame corresponding to the motion vector; and
    comparing the difference between the two fields to a predetermined threshold.

* * * * *